United States Patent
Eidus et al.

(10) Patent No.: US 9,477,505 B2
(45) Date of Patent: Oct. 25, 2016

(54) METHOD FOR REDUCING THE OVERHEAD ASSOCIATED WITH A VIRTUAL MACHINE EXIT WHEN HANDLING INSTRUCTIONS RELATED TO DESCRIPTOR TABLES

(71) Applicant: Ravello Systems Ltd., Ra'anana (IL)

(72) Inventors: Izik Eidus, Kfar Saba (IL); Leonid Shatz, Ra'anana (IL); Alexander Fishman, Netanya (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 93 days.

(21) Appl. No.: 13/658,284

(22) Filed: Oct. 23, 2012

(65) Prior Publication Data

US 2014/0052932 A1 Feb. 20, 2014

Related U.S. Application Data

(60) Provisional application No. 61/683,142, filed on Aug. 14, 2012.

(51) Int. Cl.
  *G06F 9/455* (2006.01)
  *G06F 12/08* (2016.01)
  *G06F 9/00* (2006.01)

(52) U.S. Cl.
  CPC .............. *G06F 9/45558* (2013.01); *G06F 9/00* (2013.01); *G06F 12/0891* (2013.01); *G06F 2009/45583* (2013.01)

(58) Field of Classification Search
  CPC .. G06F 12/08; G06F 9/45533; G06F 9/4856; G06F 2009/45583; G06F 12/0891; G06F 9/45541; G06F 9/45545; G06F 9/4555; G06F 9/45558; G06F 2009/45566; G06F 2009/45591
  USPC .............................................. 711/6, 208, 209
  See application file for complete search history.

(56) References Cited

U.S. PATENT DOCUMENTS

| | | |
|---|---|---|
| 5,255,379 A | 10/1993 | Melo |
| 6,397,242 B1 | 5/2002 | Devine et al. |
| 6,785,886 B1 | 8/2004 | Lim et al. |
| 7,506,096 B1 | 3/2009 | Koryakin et al. |
| 7,552,426 B2 | 6/2009 | Traut |
| 7,555,592 B1 | 6/2009 | Koryakin et al. |
| 7,689,817 B2 | 3/2010 | Zimmer et al. |

(Continued)

OTHER PUBLICATIONS

Agesen et al., Software Techniques for Avoiding Hardware Virtualization Exits, Aug. 2011, VMWare, Technical Report VMware-TR-2011-001, pp. 20-21.*

*Primary Examiner* — Reginald Bragdon
*Assistant Examiner* — Thanh Vo
(74) *Attorney, Agent, or Firm* — Precision IP

(57) ABSTRACT

A computerized method for efficient handling of a privileged instruction executed by a virtual machine (VM). The method comprises identifying when the privileged instruction causes a VM executed on a computing hardware to perform a VM exit; replacing a first virtual-to-physical address mapping to a second virtual-to-physical address mapping respective of a virtual pointer associated with the privileged instruction; and invalidating at least a cache entry in a cache memory allocated to the VM, thereby causing a new translation for the virtual pointer to the second virtual-to-physical address, wherein the second virtual-to-physical address provides a pointer to a physical address in a physical memory in the computing hardware allocated to the VM.

16 Claims, 2 Drawing Sheets

(56) References Cited

U.S. PATENT DOCUMENTS

| | | |
|---|---|---|
| 7,845,009 B2 | 11/2010 | Grobman |
| 8,024,742 B2 | 9/2011 | Lescouet et al. |
| 8,136,158 B1 | 3/2012 | Sehr et al. |
| 8,151,349 B1 | 4/2012 | Yee et al. |
| 2005/0039180 A1 | 2/2005 | Fultheim et al. |
| 2005/0076186 A1 | 4/2005 | Traut |
| 2006/0026385 A1* | 2/2006 | Dinechin et al. ............. 711/210 |
| 2006/0161719 A1* | 7/2006 | Bennett et al. ................... 711/6 |
| 2008/0005447 A1* | 1/2008 | Schoenberg et al. ............. 711/6 |
| 2009/0187729 A1* | 7/2009 | Serebrin et al. ............. 711/206 |
| 2010/0031360 A1 | 2/2010 | Seshadri et al. |
| 2012/0054748 A1 | 3/2012 | Fultheim et al. |
| 2012/0159184 A1 | 6/2012 | Johnson et al. |
| 2014/0007098 A1* | 1/2014 | Stillwell et al. .................. 718/1 |

\* cited by examiner

METHOD FOR REDUCING THE OVERHEAD ASSOCIATED WITH A VIRTUAL MACHINE EXIT WHEN HANDLING INSTRUCTIONS RELATED TO DESCRIPTOR TABLES

CROSS-REFERENCE TO RELATED APPLICATIONS

The application claims the benefit of U.S. Provisional application No. 61/683,142 filed Aug. 14, 2012, the contents of which are herein incorporated by reference.

TECHNICAL FIELD

The invention generally relates to virtual machines (VMs), and more specifically to exits from the execution of a VM resulting from attempts to use instructions that cause changes in a descriptor table.

BACKGROUND

Virtual machine (VM) is an operating environment that executes on a computing hardware with its own operating system (OS). A VM can execute applications that run within the confines of its respective OS. Furthermore, multiple VMs can be executed on a single hardware, with each VM handling the associated overhead of its own execution on the hardware. This overhead is required to ensure the proper operation of the VM on its own. In the case where multiple VMs execute on a single hardware, i.e., a computing platform that handles the plurality of VMs, it is essential at all times to ensure that operation is maintained in the correct context for each VM, and each application executing thereon.

In certain cases, execution of certain instructions in a VM context may require a VM exit in order to properly handle the instruction. A VM exit marks the point at which a transition is made from the VM currently running to the hypervisor of the VM, which must exercise system control for a particular reason. A VM exit occurs in response to certain instructions and/or events and inflicts significant performance degradation. In general, when a VM exit occurs, the processor must save a snapshot of the VM's state as it was running at the time of the exit. The VM exit may be required, for example, with instructions that handle descriptor tables. In the Intel® x86® architecture, instructions such as a load global descriptor table (LGDT) register and a load interrupt descriptor table (LIDT) require VM exits, in order to properly handle the requirements associated with these instructions within the VM context. However, and as would be appreciated by those of ordinary skill in the art, the processing time overhead of such a VM exit is significant, which in turn reduces the performance of the VM. For example, in Intel® x86® processor architecture a VM exit requires saving the processing state, recoding information about the VM exit operation, saving the current states of the descriptor tables, and so on.

It would be therefore advantageous to provide a solution that would reduce the overhead associated with a VM exit procedure.

SUMMARY

Certain embodiments of the invention include a computerized method and a computer readable medium for efficient handling of a privileged instruction executed by a virtual machine (VM). The method comprises identifying when the privileged instruction causes a VM executed on a computing hardware to perform a VM exit; replacing a first virtual-to-physical address mapping to a second virtual-to-physical address mapping respective of a virtual pointer associated with the privileged instruction; and invalidating at least a cache entry in a cache memory allocated to the VM, thereby causing a new translation for the virtual pointer to the second virtual-to-physical address, wherein the second virtual-to-physical address provides a pointer to a physical address in a physical memory in the computing hardware allocated to the VM.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
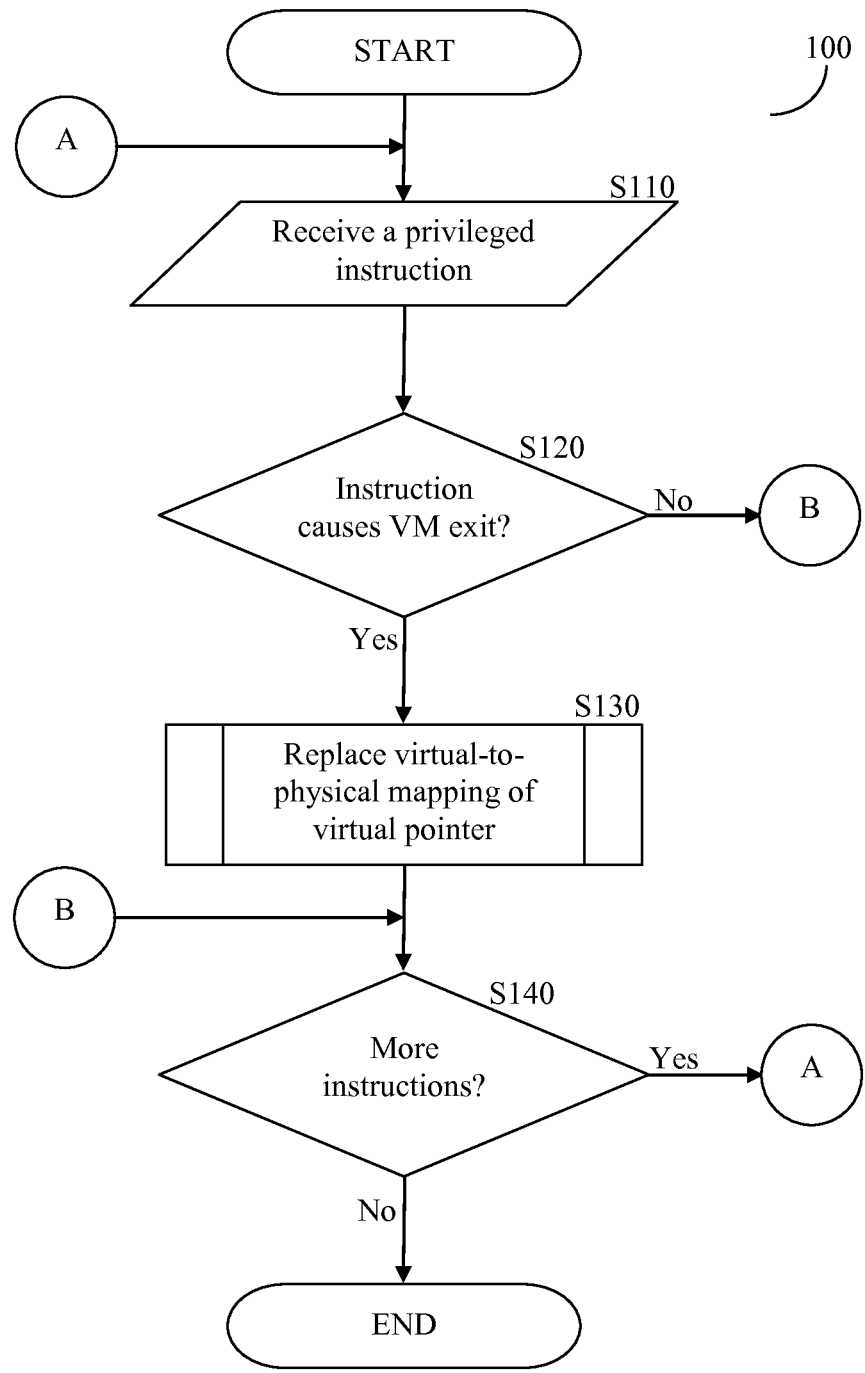
FIG. 1 is a flowchart showing the capturing of instructions that operate in order to load a descriptor table according to an embodiment.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A virtual machine (VM) may need to execute privileged instructions related to a descriptor table register. In some architectures, such as Intel® x86® architecture these may include instructions, such as a load global descriptor table (LGDT) register and load interrupt descriptor table (LIDT). These instructions appear only in operating system (OS) software and they are not used in application programs. However, in a VM, an attempt to execute such an instruction causes a significant overhead and impact to performance.

According to various embodiments disclosed herein, instead of execution of such instructions by the VM, the hypervisor causes a change in the memory mapping of a relevant system table or structure, referenced by a pointer, from a first physical address to a second physical address that would achieve the same result as if handling a full execution of an instruction.

Specifically, upon encountering an instruction, such as a LGDT or a LIDT that would require a VM exit if executed, a series of steps take place, by the hypervisor executing the VM, to prevent a VM exit while achieving the same result. The steps rely upon the well-behaved manner that a VM is planned to operate within a VM environment.

FIG. 1 shows an exemplary and non-limiting flowchart 100 that depicts the capturing of instructions that operate to load a descriptor table according to one embodiment. In S110, an instruction is received for examination. In S120, it is determined if this is a privileged instruction that requires a VM exit, and if so execution continues with S120; otherwise, execution continues with S140. As noted above, instructions that may cause a need for a VM exit include, but are not limited to, LGDT and LIDT instructions.

Figure 2:
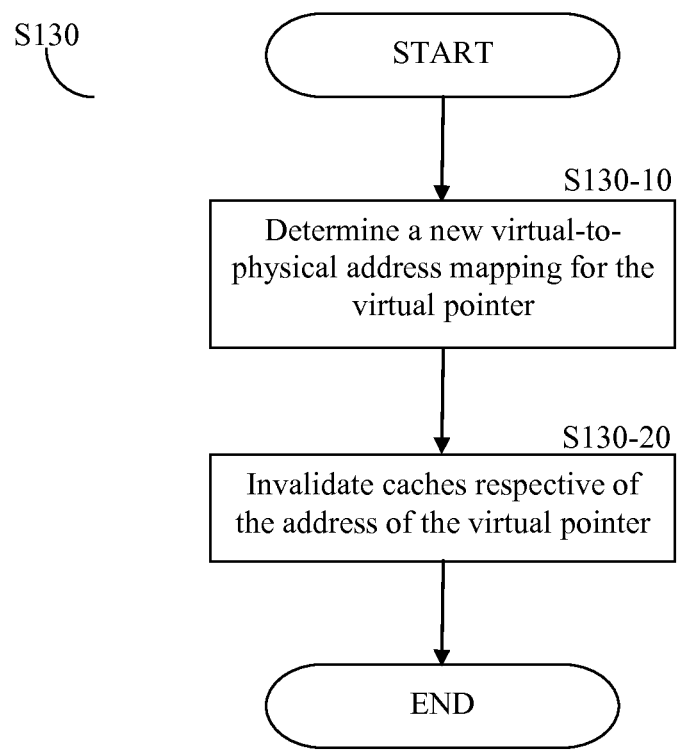
FIG. 2 is a flowchart showing handling of pointers referenced by an instruction which operates to load a descriptor table according to an embodiment.

In S130, replacement of the relevant system table mappings referenced by the pointers takes place, which is explained in more detail with respect of FIG. 2. In S140, it is checked whether more instructions are to be examined and if so, execution continues with S110; otherwise, execution terminates.

It should be understood that the operation of the method described in FIG. 1 may be performed at run-time, such as would be the case with an interpreter-like operation at the time when OS code is programmed, or at compilation time, such as would be the case with a complier-like operation. The various compilation interpreter techniques should be considered within the scope of the embodiments disclosed herein.

A descriptor table is pointed to by a pointer containing a virtual address, for example, vptr1. This virtual address points to a physical address, for example phy1, the content of which is handled when addressed accordingly. This new virtual address is set, for example, by using instructions such as a load interrupt dispatch table (LIDT) or a load global dispatch table (LGDT). According to certain embodiments disclosed herein, when encountering any of these instructions that cause a VM exit, the memory mapping tables that map vptr1 to phy1 are changed to remap vptr1 to a new physical address, for example, phy2. Thereafter, the content of the processor memory mapping caches are invalidated using vptr1. As a result, the new virtual address translation will take effect and cause execution based on a translation from vptr1 to phy2 instead of to phy1. By doing so the need to perform a costly VM exit is overcome.

It should be noted that when attempting to avoid VM exits, according to an embodiment, a conflict may arise between multiple processors sharing the same physical machine memory, due to two or more processors of such a system using identical system table pointers, such as a global descriptor table (GDT) pointer or an interrupt descriptor table (IDT) pointer, at the same time. Therefore, according to one embodiment, in order to avoid such conflict, each processor makes use of a different and unique per-processor virtual address vptr1 for mapping of identical system table pointers, so that memory mappings related thereto do not overlap nor conflict with each other on different processors. That is, in a case of a system with multiple processors, an embodiment refers to vptr1-1 for processor-1, vptr1-2 for processor-2, and so on, while the values of vptr1-n, n being an integer value of 1 or greater, are unique for each processor in the set of all available processors. It should be noted that a processor may be, but is not limited to, a CPU, a controller, a microcontroller, a multi-core processor, a core of a multi-core processor, and the like, whether as a software module executing on another processor, or as an actual hardware component.

It should be appreciated that instructions like LIDT and LGDT change not only the table's address, but also the length of each of the descriptor tables. However, in most cases, and more specifically in regard to the teachings disclosed herein, an OS seldom changes the table length after its initialization sequence, when performance issues are more significant. Furthermore, when an OS changes the descriptor table's length, it is possible to emulate its effect by other means, such as, but not limited to, filling such tables with values which cause exceptions, and by further providing descriptor table(s) large enough to accommodate possible changes of the table length in the supported OS systems. It should be noted that when the length of a descriptor table changes, an exception is issued and the OS corrects the table's size to a larger length.

FIG. 2 is an exemplary and non-limiting flowchart S130 showing the step of handling pointers responsive of an instruction that operates to load a descriptor table according to one embodiment. In S130-10, a new physical address, for example phy2, respective of the virtual address of the table descriptor pointer vptr1 is determined. As a result, access to the memory is made from a different table than before such a change was made. In S130-20, memory translation caches are invalidated with respect of the virtual address, for example, the address of vptr1. This is performed in order to ensure that any further access through vptr1 will require a translation to the new physical address, for example physical address phy2. The invalidation operation may be on a specific address, an address range, a page, or in some cases the entire memory cache. The invalidation is performed using the invalidation scheme defined for the memory cache in the computing hardware allocated to the VM.

While the solution described hereinabove is made with respect to certain embodiments related to Intel's x86 architecture instructions LIDT and LGDT, the embodiments disclosed herein can also be utilized to reduce the overhead associated with VM exits when encountering certain privileged instructions that would otherwise require a VM exit. By using the techniques shown herein, the VM exit overhead is reduced by providing an alternative that relies on the well-behaved structure of a VM within its operational context.

The various embodiments of the invention may be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for efficient handling of a privileged instruction executed by a virtual machine (VM) to prevent a VM exit, comprising:
   capturing a privileged instruction, wherein the captured privileged instruction when executed causes a VM executing on a computing hardware to perform a VM exit;
   without performing a VM exit, replacing a first virtual-to-physical address mapping with a second virtual-to-physical address mapping for a virtual pointer associated with the privileged instruction, wherein the first virtual-to-physical address mapping provides a mapping of a first virtual address to a first physical address and the second virtual-to-physical address mapping provides a mapping of the first virtual address to a second new physical address, the first physical address having been pointed to by only the first virtual address at the time of the replacing; and
   invalidating at least a cache entry in a cache memory allocated to the VM, thereby causing a new translation for the virtual pointer using the second virtual-to-physical address mapping, wherein the second virtual-to-physical address provides a pointer to the second new physical address in a physical memory in the computing hardware allocated to the VM.

2. The computerized method of claim 1, wherein the privileged instruction affects at least a descriptor table register.

3. The computerized method of claim 2, wherein the privileged instruction is any one of: a load global descriptor table (LGDT) register and a load interrupt descriptor table (LIDT).

4. The computerized method of claim 3, further comprising:
   determining if a length of at least one of the global descriptor table and the interrupt descriptor table has been increased; and
   filling each table having an increased length with values which when accessed cause exceptions.

5. The computerized method of claim 2, wherein the virtual address points to a descriptor table, and further wherein the replacing of the first virtual-to-physical address mapping with the second virtual-to-physical address mapping causes access to memory by the VM to be made using a different table than prior to the replacement.

6. The computerized method of claim 1, further comprising:
   resolving conflicts between a plurality of processors sharing the physical memory, wherein the plurality of processors execute the VM.

7. The computerized method of claim 6, wherein resolving the conflicts between the plurality of processors further comprising:
   assigning for each of the plurality of processors a virtual pointer uniquely identified by each of the plurality of processors, wherein the replacement of the first virtual-to-physical address mapping results in the second virtual-to-physical address mapping that is uniquely assigned to each of the plurality of processors.

8. The computerized method of claim 1, wherein invalidating of the cache entry is performed by an invalidation scheme defined for a memory cache in the computing hardware allocated to the VM.

9. A non-transitory computer readable medium having computer program logic recorded thereon for executing on at least one processor for handling of at least a privileged instruction executed by a virtual machine (VM), comprising:
   computer program code for capturing a privileged instruction, wherein the captured privileged instruction when executed causes a VM executing on the at least one processor to perform a VM exit;
   computer program code for replacing a first virtual-to-physical address mapping with a second virtual-to-physical address mapping for a virtual pointer associated with the privileged instruction instead of performing the VM exit, wherein the first virtual-to-physical address mapping provides a mapping of a first virtual address to a first physical address and the second virtual-to-physical address mapping provides a mapping of the first virtual address to a second new physical address, the first physical address having been pointed to by only the first virtual address at the time of the replacing; and
   computer program code for invalidating at least a cache entry in a cache memory allocated to the VM, thereby causing a new translation for the virtual pointer using the second virtual-to-physical address mapping, wherein the second new virtual-to-physical address provides a pointer to a physical address in a physical memory in the computing hardware allocated to the VM.

10. The non-transitory computer readable medium of claim 9, wherein the privileged instruction affects at least a descriptor table register.

11. The non-transitory computer readable medium of claim 10, wherein the privileged instruction is any one of: a load global descriptor table (LGDT) register and a load interrupt descriptor table (LIDT).

12. The non-transitory computer readable medium of claim 11, further comprising:
    computer program code for determining if a length of at least one of the global descriptor table and the interrupt descriptor table has been increased; and
    computer program code for filling each table having an increased length with values which when accessed cause exceptions.

13. The non-transitory computer readable medium of claim 9, further comprising:
    computer program code for resolving conflicts between a plurality of processors sharing the physical memory, wherein the plurality of processors execute the VM.

14. The non-transitory computer readable medium of claim 13, wherein resolving the conflicts between the plurality of processors further comprising:
    assigning for each of the plurality of processors a virtual pointer uniquely identified for each of the plurality of processors, wherein the replacement of the first virtual-to-physical address mapping results in the second virtual-to-physical address mapping that is uniquely assigned to each of the plurality of processors.

15. The non-transitory computer readable medium of claim 9, wherein invalidating of the cache entry is performed by an invalidation scheme defined for a memory cache in the computing hardware allocated to the VM.

16. The non-transitory computer readable medium of claim 9, wherein the virtual address points to a descriptor table, and further wherein the replacing of the first virtual-to-physical address mapping with the second virtual-to-physical address mapping causes access to memory by the VM to be made using a different table than prior to the replacement.

* * * * *

UNITED STATES PATENT AND TRADEMARK OFFICE
CERTIFICATE OF CORRECTION

PATENT NO. : 9,477,505 B2
APPLICATION NO. : 13/658284
DATED : October 25, 2016
INVENTOR(S) : Izik Eidus, Leonid Shatz and Alexander Fishman Page 1 of 1

It is certified that error appears in the above-identified patent and that said Letters Patent is hereby corrected as shown below:

On the Title Page

The Assignee, labeled with Item (73), "Oracle International Corporation, Redwood Shores, CA (US)" should be changed to --Ravello Systems Ltd., Ra'anana (IL)--.

Signed and Sealed this
Seventh Day of February, 2023

Katherine Kelly Vidal
*Director of the United States Patent and Trademark Office*